United States Patent Office 3,828,106
Patented Aug. 6, 1974

3,828,106
NOVEL ORAL PHARMACEUTICAL DOSAGE FORM
Harry W. Rudel, New York, N.Y., assignor to Biological Concepts, Inc., New York, N.Y.
No Drawing. Filed Jan. 3, 1972, Ser. No. 215,208
Int. Cl. A61k 17/00
U.S. Cl. 424—239　　　　　　　　　　　　　12 Claims

ABSTRACT OF THE DISCLOSURE

A pharmaceutical preparation suitable for oral administration comprises an active therapeutic ingredient in solid solution with a steroidal lipid, together with a pharmaceutically acceptable carrier for said mixture. The therapeutic ingredient may be, for example, a natural steroid hormone, and the lipid may be a sterol. The preparation may be provided in unit dosage forms such as tablets, lozenges, capsules, and the like.

BACKGROUND OF THE INVENTION

The present invention relates to a novel pharmaceutical dosage form adapted to oral administration of medicaments which have heretofore been only marginally active, or else substantially inactive, when taken orally.

It is well known in pharmaceutical practice that many useful therapeutic agents are inactive, or only moderately active, when taken orally in the conventional pharmaceutical dosage forms, such as tablets, capsules, lozenges, extracts, or elixirs. Other medicaments must be taken frequently, for example, two, three or four times a day, to achieve good therapeutic repsonse. Thus, for example, relatively large amounts of the natural steroid hormones, such as progesterone, testosterone, or estradiol, must be given orally to achieve a moderate therapeutic response, yet the same hormones, when injected subcutaneously, or intramuscularly, in oil solution, or as microcrystalline suspensions, display good activity, and elicit an excellent therapeutic response.

Many other steroid compounds similarly exhibit a separation between their oral and parenteral biological activity. For example, estradiol, a horomone primarily produced by the ovary, is more active when injected than when given by mouth. When estradiol is given orally, the customary dose may be 0.2 to 0.5 mg. one to three times per day, but when administered parenterally, a dosage of only 0.2 to 1.0 mg. may be given 2 to 3 times per week.

Progesterone and other naturally occurring steroids exhibit very poor oral activity. Thus, it usually takes 20 mg. daily of progesterone administered intramuscularly for a period of 10 days to produce a secretory effect on an estrogen-primed endometrium. On the other hand, if progestrone is given orally, it requires as much as 1.0 gram or more daily for 10 days to produce a secretory effect of somewhat lesser intensity.

It is generally accepted that the reason for the low oral activity of natural steroid hormones is the manner in which these substances are absorbed from the digestive system. It has been demonstrated in pharmacological studies that steroid hormones are absorbed from the intestines and carried by the blood through the portal system to the liver where they are rapidly inacivated by enzymatic reactions. Thus, for example, progestrone given by mouth will be absorbed by the intestinal tract, but after absorption the steroid is taken by the portal circulation to the liver where it is inactivated, or more accurately, metabolized, to biologically inactive compounds. This process is apparently very rapid and considerable progesterone is needed to be available for biological sites peripheral to the liver.

Efforts to overcome this inherent difficulty in steroid metabolism have heretofore not been successful. Since to many patients, repeated intramuscular injections are an unacceptable form of therapy, research in the steroid field has been directed mainly toward the preparation of synthetic hormones, or of compounds embodying chemical modifications of the steroid molecule, as one way of overcoming the difficulty. Thus, for example, it was found several years ago that the introduction of a substituent into the 17α-position of an estrane or androstane molecule imparts oral activity. Examples of such orally active compounds include 17α-methyltestosterone (17α-methyl-17α-hydroxy-4-androsten-3-one) used to provide androgenic activity, for example, in patients with Kleinfelter's syndrome, estrogenic hormones such as 17α-ethynyl estradiol (17α-1,3,5(10) - estratriene-3-17β-diol), or various compounds having progestational activity used also as components of oral contraceptives such as, for example, norethindrone (17α-ethynyl-17β-hydroxy-4-estren-3-one), norethynodrel, (17α-ethynyl-17β-hydroxy-5(10)estren-3-one), ethynodiol diacetate (17α-ethynyl-4-estrene-3β,17β-diol-diacetate) and norgestrel (13β-ethyl-17α-ethynyl-17β-hydroxy-4-gonen-3-one). Chemical modification of the progestrone molecule by introducing an acetoxy group at the 17-position has resulted in compounds having oral activity; additional substitution, as on $C_6$ of the steroid molecule, further increases the activity. Compounds which have been found useful for the treatment of various disorders, and also used for the inhibition of fertility, include megestrol acetate (6-methyl-17α-acetoxy-4,6-pregnadiene-3,20-dione), chlormadinone acetate (6-chloro-17α - acetoxy-4,6-pregnadiene-3,20-dione), and medroxyprogestrone acetate (6α-methyl-17α-acetoxy-4-pregnene-3,20-dione).

Modifications of the cortisol molecule which have been found to result in increased oral activity include introduction of a double bond (prednisolone or 11β,17α,21-trihydroxy-1,4-pregnadiene-3,20-dione), and providing additionally substituted compounds such as paramethasone acetate (6α-fluoro-16β-methyl - 11β,17α,21 - trihydroxy-1,4-pregnadiene-3,20-dione), and fluocinolone (9α-fluoro-11β,16α,17α,21-tetrahydroxy-1,4-pregnadiene-3,20-dione).

While the foregoing chemical modifications have imparted oral activity to steroid hormones, they have also resulted in undesirable toxic side-effects. It has been discovered that 17α-alkyl, or alkylene androstane, or estrane derivatives, as for example, methyltestosterone, or certain components of contraceptive pills adversely influence the hepatic function. High dosages may sometimes result in impairment of the hepatic function, or even juandice. Moreover, some of the 17α-acetoxyprogestrone derivatives were found to exhibit undesirable corticoid-like activity, and synthetic corticoids may produce excessive retention of sodium in the body.

Thus, a major drawback of the prior art was that chemical modification of the steroid hormones resulted in orally active compounds, but this was accompanied by many undesirable side effects.

Other types of natural hormones also cannot be successfully administered orally as such. These include the prostaglandins such as prostaglandin $E_1$ and prostaglandin $F_2\alpha$ which have recently been found to be useful for inducing uterine contractions, and which must be administered intravenously or directly into the uterus. These compounds are not active when given orally.

Still another example of chemotherapeutic agents which have to be given several times a day to achieve the desired therapeutic effect are the antibiotics. It is well known that penicillin is only poorly active when taken by mouth. Tetracycline must be taken every 4 to 6 hours to obtain a good therapeutic effect.

Accordingly, the art has sought a way to enhance the oral activity of natural steroid hormones as well as to modify the oral activity of synthetic steroid hormones, and of the prostaglandins, to render these valuable therapeutic agents capable of functioning as well or better when administered orally, than when administered parenterally.

GENERAL DESCRIPTION OF THE INVENTION

In accordance with a first aspect of the present invention, it has been found, surprisingly and unexpectedly, that the oral activity of certain medicaments, such as the natural steroid hormones and the prostaglandins, can be markedly increased by forming a lipophilic solid solution of the medicament with a steroidal lipid. In accordance with a second aspect of the invention, it has been found that the oral activity of selected synthetic steroid hormones can be controlled or modified by forming a lipophilic solid solution of the synthetic steroid hormone with a steroidal lipid. For purposes of oral administration the medicament-steroidal lipid solid solution is deposited on a suitable inert pharmaceutically acceptable carrier so as to provide the desired dosage form.

A major advantage of the dosage form of the present invention is its ability to decrease or attenuate the amount of the medicament (e.g. natural steroid hormone) dosage drastically, while at the same time a therapeutic response of the desired magnitude is produced and sustained in the patient. This makes it possible to reduce the consumption of what are, for most part, expensive medications, with accompanying benefits to the patient or hospital both in monetary terms and in the general wellbeing of the person being treated.

Another advantage of the present invention is that it makes possible the oral administration of certain medicaments, such as therapeutic steroids, which could heretofore have been given only by injection, or by mouth in repeated and larger dosages. This applies particularly to the natural steroid hormones and the prostaglandins, and permits the physician to avoid or greatly reduce the use of those synthetic hormones which may expose the patient to undesirable or even toxic side-effects of these drugs when employed for prolonged periods of time. Thus, for example, the invention makes it possible to administer orally testosterone, instead of methyltestosterone, to provide an androgenic effect in hypogonadal patients, or to use estradiol and progesterone for contraceptive or other purposes.

An additional advantage is that the novel pharmaceutical dosage form of the invention can be formulated in conventional manner, into tablets, lozenges, capsules, and the like, which are readily stored and dispensed.

The steroidal lipids which are employed to form lipophilic solid solutions with the therapeutic agents, in accordance with the invention, and to impart or improve oral activity thereof, are characterized by being solid at room temperature, i.e. they do not melt below about 15° C. These lipids are cyclopentanoperhydrophenanthrene type compounds of vegetable or animal origin.

Examples of such steroidal lipids are (1) bile acids, such as, for example, cholic, cholanic, or desoxycholic acid, or their ethyl esters, or cholic acid methyl ester-3,7-diacetate; (2) sterols, such as cholesterol, β-sitosterol, zymasterol, stigmasterol, cholestanol, 7-dehydrocholestenol, coprostanol, 7-dehydrocoprostenol, epicoprostenol, demosterol, campestrol, ergosterol, fucosterol, and 24-hydroxycholesterol, and the esters of these sterols derived from organic carboxylic acids containing from 1 to 12 carbon atoms. The carboxylic acids may be saturated or unsaturated, straight chain or branched chain aliphatic, alicyclic, cycloaliphatic, aromatic carboxylic acids, which may be further substituted by a hydroxy group, a halogen atom, such as chlorine, bromine, or fluorine, or by an acyloxy group containing from 1 to 12 carbon atoms. Typical sterol esters which may be employed, in accordance with the invention, include the acetate, propionate, butyrate, hemisuccinate, enanthate, caproate, benzoate, trimethylacetate, phenoxyacetate, phenylpropionate, and β-chloropropionate.

In accordance with the invention, one or more of the aforementioned steroidal lipids are admixed with the medicament in proportions such as to form a solid solution. Solid solutions or isomorphous mixtures occur if two components are miscible with each other. Two components may or may not form an unbroken series of solid solutions. To determine the proportions at which two components form an isomorphous substance, the methods of thermal analysis can be employed, e.g. by determination of the freezing or melting temperatures as described, for example, in "The Phase Rule and Its Applications," by A. Findlay, published by Longmans, Green and Co., New York (1927).

When a medicament and a steroidal lipid form an unbroken series of solid solutions the proportion of either component is selected in such manner as to provide the desired strength in the final composition. When the two components do not form an unbroken series of solid solutions, the proportion of either component will depend upon the region of stable equilibrium. A region of stable equilibrium is usually associated with a melting point or range minimum which is below that of the individual components or of any other mixture of the same components. This corresponds to a eutectic region. It will be recognized that in this region both components crystallize in constant proportion. It will be apparent to those skilled in the art that it is possible to select other mixtures close to the eutectic region. In such case, there is simply present an excess of one or the other component. Thus, the solid solutions of the invention may include binary steroid hormone mixtures, or ternary, or other multiphase mixtures, including two or more lipids or therapeutic steroids. For some lipids, or mixtures of lipids, the proportions of the components showing the lowest melting point range may vary rather widely, but the melting point range itself is, in general, comparatively well defined.

As pointed out previously, natural steroids such as, for example, progesterone, when administered orally, are absorbed by the intestinal tract, but following such absorption, the steroid is transported by the portal circulation to the liver where it is inactivated or metabolized to an inactive form. It is known to prepare an orally active therapeutic composition by forming a solution of progesterone in a glyceride ester or oil, and a composition of this type is disclosed in U.S. Pat. 3,284,303. However, the intestinal tract has not only a portal capillary absorption system but also a lymphatic capillary system which drains into the thoracic duct and by-passes the liver. The drawback of a glyceride carrier for the steroid is that it hydrolyzes. By dissolving a steroid such as progesterone, it is possible that the steroid would be carried into the lymphatic circulation with the glyceride. However, glycerides, and particularly triglycerides are effectively hydrolyzed in the intestines, even to the extent of over 90%. When this occurs, the steroid in a glyceride solution will be precipitated out of solution and become absorbed through the regular portal capillary circulation. This circumstance is avoided when the steroidal lipids are utilized to form solid solution mixtures with natural steroid hormones, in accordance with the invention.

While not wishing to be bound by any particular theory, it is believed that the solid solutions of the invention are capable of being absorbed directly by the lymphatic capillary system, thereby by-passing the portal circulation system, and avoiding the problem of disruption by intestinal hydrolysis.

The therapeutic steroid hormones or other steroids which are capable of forming solid solution mixtures with steroidal lipids, in accordance with the invention, may include a wide range of such compounds which exhibit the desired specific therapeutic action. The steroids will usually be members of the estrane, androstane, or pregnane series, but the invention is not limited thereto.

Where the solid solution preparation of the invention is to be used for contraceptive purposes, the steroid hormones may be progestational or estrogenic compounds, or a combination of both. These may be of natural or synthetic origin. Thus, for example, natural steroid hormones within contemplation of the invention include progesterone, testosterone and estradiol, but the invention is not limited thereto. Synthetic steroid hormones may also be employed, such as, for example, 19-nor-progesterone, norethindrone, norenthindrone acetate, norethynodrel, ethynodiol diacetate, norgestrel, chlormadinone acetate, megestrol acetate, or lynestrol, and the like. Synthetic estrogenic steroid hormones may be, for example, ethynyl estradiol or mestranol. In other areas, such as steroid anti-inflammatory agents, there may be empolyed a steroid hormone of natural origin, such as cortisol (hydrocortisone), or a synthetic steroid hormone having anti-inflammatory properties, such as prednisolone, paramethasone, or dexamethasone.

The preparation of the solid solution of the steroidal lipid and the hormone will vary with both the choice of the drug and the lipid, but is readily determined in a given system by carefully mixing and/or melting the components together and then disintegrating the resulting mass, for example, by dispersion, milling, or the like. The melting points of compositions containing varying proportions of the components are then measured. The mixture having the lowest melting point or range has the desired proportions according to the invention. The mixture showing the lowest melting range is preferred, but mixtures melting 10 to 15° C. above the lowest melting temperature may also be employed in some cases.

Examples of steroid hormone-steroid lipid mixtures forming a wide range of solid solutions are set forth in Table 1.

TABLE 1

| Steroid hormone | Steroid lipid | Recommended range [1] | Uncorrected M.P.[2] |
|---|---|---|---|
| Progesterone | β-Sitosterol | 10-70 | 85-110 |
|  | β-Sitosterol acetate | 40-90 | 100-125 |
|  | β-Sitosterol palmitate | 20-80 | 85-125 |
|  | Cholesterol | 35-75 | 106-115 |
|  | Cholesterol acetate | 10-90 | 95-115 |
|  | Cholesterol palmitate | 5-35 | 115-130 |
|  | Cholesterol pivalate | 20-35 | 110-130 |
|  | Stigmasterol acetate | 10-80 | 115-130 |
|  | 7-dehydrocholesterol | 20-80 | 100-120 |
|  | Dihydrocholesterol | 10-90 | 100-120 |
|  | Ergosterol | 10-90 | 110-130 |
| Estradiol | Stigmasterol | 5-85 | 160-175 |
|  | Stigmasterol acetate | 5-90 | 150-170 |
|  | Ergosterol | 5-90 | 155-170 |
|  | Dihydrocholesterol | 20-80 | 140-165 |
| Testosterone | Cholesterol acetate | 5-35 | 130-155 |
|  | Cholesterol stearate | 5-55 | 145-155 |
|  | β-Sitosterol palmitate | 5-50 | 145-155 |
|  | Stigmasterol | 10-50 | 135-150 |
|  | Stigmasterol acetate | 55-90 | 130-145 |
| Norethindrone | β-Sitosterol palmitate | 5-40 | 190-200 |
|  | 7-dehydrocholesterol | 5-60 | 170-190 |
| 19 norprogesterone | Cholesterol | 5-65 | 115-135 |
|  | Cholesterol acetate | 5-80 | 95-105 |
|  | β-Sitosterol | 15-75 | 100-115 |

[1] Lipid component percent by weight.
[2] Range of mixture, 0° C.

Examples of steroid hormone-steroid lipid mixtures forming a narrow range of solid solutions are shown in the following table:

TABLE 2

| Steroid hormone | Steroid lipid | Recommended range [1] | Melting range [2] |
|---|---|---|---|
| Progesterone | Coprostan-3-one | 10-20 | 55-65 |
| Megestrol acetate | Cholesterol | 75 | 140-165 |
|  | Cholesterol acetate | 10-30 | 180-210 |
|  | 7-dehydrocholesterol | 90 | 100-125 |
|  | β-Sitosterol | 80 | 130-150 |
|  | Stigmasterol | 75-90 | 150-170 |
| Testosterone | 5-dihydrocholesterol | 70-80 | 105-110 |
|  | Ergosterol | 45-55 | 90-120 |
| Norethindrone | Cholesterol | 85-95 | 135-145 |
|  | Stigmasterol | 80-95 | 160-165 |
|  | Dihydrocholesterol | 85-95 | 120-135 |

[1] Lipid component percent by weight.
[2] Mixtures (uncorrected).

Melting points of some compositions may indicate that two or more different weight ratios form isomorphous mixtures. This is illustrated by estradiol-cholesterol mixtures which exhibit two distinct melting point depressions, one containing 35 percent by weight of cholesterol (m.p. 145–155° C.) and another containing 85 percent by weight of cholesterol (m.p. 135–145° C.). Testosterone and 7-dehydrocholesterol mixtures are another example. A 30:70 parts by weight composition exhibits a m.p. 85–120° C.; a 60:40 parts by weight composition exhibits a m.p. 100–125° C.

In order to prepare oral dosage forms, the solid solutions of the invention are admixed with a suitable conventional pharmaceutically acceptable carrier which is inert to the therapeutic composition. Examples of suitable materials of this type include lactose, glucose, starch, mannitol, magnesium stearate, or Avicel (micro crystalline cellulose particles, mol. wt. 30,000–50,000).

Mixing can be performed, for example, by dissolving the solid solution in a volatile organic solvent such as, for example, chloroform or ethanol, and adsorbing the solution onto particles of the inert carrier material, or by milling the mixture and the carrier in a suitable apparatus, such as a ball mill or the like. The proportion of therapeutic steroid and lipid and of inert carrier is selected in accordance with the nature of the desired end product. Thus, a proportion of about 10 parts by weight of steroid lipid mixture to from about 1 to 50 parts by weight of inert carrier, is advantageous for the preparation of tablets or capsules. The drug-lipid mixture, alone or adsorbed on the inert carrier, may be made up into any desired dosage form, such as filled gelatin capsules, or can be compressed into tablets or lozenges, in accordance with conventional pharmaceutical practice. Other adjuvants, such as lubricants or binding agents, for example, vegetable gums, or polyvinylpyrrolidone, may be incorporated into the dosage forms, if desired.

DESCRIPTION OF THE PREFERRED EMBODIMENTS

The following examples will serve to illustrate the practice of the invention, but are not to be considered as limiting:

Example I

Progesterone, 0.93 g. and cholesterol acetate, 2.17 g. were dissolved in 15 ml. of methylene chloride. The solution was evenly mixed with 3.1 g. of lactose, the solvent was evaporated and the dry progesterone-chloesterol acetate on lactose was filled into gelatine capsules, each capsule containing 50 mg. progesterone equivalent. Another batch of capsules was prepared in a similar manner, except that cholesterol acetate was not used. Five male human volunteers were used in the study. Each volunteer was given one capsule. Blood samples were taken 2 and 6 hours after ingestion and the amount of progesterone circulating in blood was determined by a protein binding technique. Three days later the same volunteers were given the second preparation and the amounts of progesterone circulating in blood was again determined; thus each subject served as its own control. The table below summarizes the mean values found in the five subjects.

Progesterone in blood after oral administration of 50 mg.

| Dosage form used— | Progesterone in plasma, mcg./ml. | |
| --- | --- | --- |
| | 2 hrs. | 6 hrs. |
| Progesterone on lactose | 1.3 | 2.4 |
| Progesterone-cholesterol acetate on lactose | 6.8 | 8 |

The above results show that oral absorption of progesterone was markedly increased by adding cholesterol acetate.

Example II

The above experiment was repeated. The following preparations were used. Progesterone on lactose and progesterone-cholesterol acetate on lactose made as described in Example I. Progesterone cholesterol (38:62 parts by weight) on lactose, and progesterone-$\beta$-sitosterol (42:58 parts by weight) on lactose also made as described in Example I. Each preparation was filled into gelatine capsules to contain 50 mg. of progesterone equivalent. The amounts of progesterone found in plasma after ingestion was measured on 1, 2, 3, 4, 6 and 12 hours intervals. The results were as follows:

Progesterone in blood after oral administration of 50 mg.

| Dosage form used— | Progesterone in plasma, mcg./ml. | | | | | |
| --- | --- | --- | --- | --- | --- | --- |
| | 1 hr. | 2 hrs. | 3 hrs. | 4 hrs. | 6 hrs. | 12 hrs. |
| Progesterone on lactose | 3.0 | 5.0 | 4.6 | 3.5 | 0.4 | 0.0 |
| Progesterone-cholesterol acetate on lactose | 4.0 | 3.2 | 8.0 | 6.2 | 2.5 | 1.7 |
| Progesterone-cholesterol on lactose | 7.2 | 8.2 | 6.8 | 6.2 | 2.4 | 0.4 |
| Progesterone-$\beta$-sitosterol on lactose | 6.8 | 3.2 | 7.4 | 6.0 | 3.9 | 0.2 |

The above results show that oral absorption of progesterone was markedly improved by mixing progesterone with lipids.

Example III

A mixture of testosterone, 1.2 g. and cholesterol, 1.2 g. was dissolved in 50 ml. of chloroform. The chloroform solution was added to 6 g. of powdered lactose in a mortar. The chloroform was evaporated by passing a stream of hot air, the dried powder was passed through a 40 mesh screen and encapsulated to contain 50 mg. of testosterone per capsule. Testosterone on lactose (not containing cholesterol) was prepared in a similar manner. Plasma levels of testosterone were determined in a human volunteer using essentially the same technic as described in Example 1. The results are summarized below.

Testosterone plasma levels in a human volunteer after ingesting 50 mg. of testosterone

| Dosage form used— | Testosterone in plasma, mcg./ml. | |
| --- | --- | --- |
| | 0 hr. | 2 hrs. |
| Testosterone on lactose | 2.1 | 3.1 |
| Testosterone-cholesterol on lactose | 2.8 | 5.3 |

The above results indicate that the addition of cholesterol to testosterone has markedly increased the absorption of the steroid after oral administration.

Example IV

It is common knowledge that following an ingestion of tetracycline, 125 or 250 mg., the highest plasma levels in humans are detected 2 hours after administration. Highest amounts following oral administration are excreted in urine 4 hours after administration.

Tetracycline base, 1 g., and cholesterol, 1 g., were dissolved in 120 ml. of methanol. The solution was absorbed on 2 g. of lactose and the solvent was slowly evaporated to insure a uniform distribution of the cholesterol-tetracycline mixture on the glucose. The dry powder was filled into hard gelatine capsule by weighing accurately 500 mg. into each capsule; thus each capsule contained 125 mg. of tetracycline base.

A human volunteer took two such capsules, i.e., 250 mg. tetracycline base equivalent, and collected the urine on the following intervals after ingestion: 2, 4, 8, 12, 24 and 48 hours. The amount of tetracycline base present was determined using the standard assay procedure. The following table shows the amounts of tetracycline base detected at each time interval.

| Time interval (hrs. after ingestion): | Tetracycline base excreted, mg/hr. |
| --- | --- |
| 2 | 2.14 |
| 4 | 3.61 |
| 8 | 5.40 |
| 12 | 3.50 |
| 24 | 2.12 |

The above results show that by employing a cholesterol-tetracycline base combination the maximal amounts of tetracycline base were excreted in urine 8 hours after ingestion indicating that the antibiotic circulating in plasma about twice as long as is normally found with commercially available tablets.

Example V

Progesterone-cholesterol acetate solid solution was deposited on lactose and filled into capsules as described in Example I, except that each capsule contained 100 mg. progesterone equivalent. Progesterone values in peripheral plasma, which are indicative of the therapeutic effect were measured in five volunteers as described in Example I except that blood samples were collected 4, 6, 10 and 24 hrs. after ingestion. The mean values which were obtained (nanograms of progesterone per ml. of plasma) were as follows: 12.5 mcg./ml. at 4 hrs; 10 mcg./ml. at 6 hrs.; 5 mcg./ml. at 10 hrs., and 2.5 mcg./ml. at 24 hrs. The above results demonstrate that detectable amounts of progesterone were found circulating in plasma 24 hrs. after ingestion when mixed with cholesterol acetate in eutectic proportion.

Example VI

Progesterone-$\beta$-sitosterol solid solution on lactose was prepared in gelatine capsules as described in Example II except that each capsule contained 100 mg. progesterone equivalent. The efficacy of the preparation was tested by measuring the levels of progesterone circulating in peripheral plasma as described in Example I, except that blood samples were taken at 2, 4, 6 and 10 hrs. after ingestion. The mean values which were detected were as follows: 17.5 mcg./ml. at 2 hrs.; 15 mcg./ml. at 4 hrs.; 5 mcg./ml. at 6 hrs., and 5 mcg./ml. at 10 hrs. The above results demonstrate that significant amounts of progesterone were found circulating in the peripheral plasma 10 hrs. after ingestion, when mixed with $\beta$-sitosterol in eutectic proportion.

Example VII

Progesterone-cholesterol acetate solid solution (32 parts of progresterone by weight and 68 parts of cholesterol acetate by weight) was dissolved in chloroform containing polyvinylpyrrolidone and the solution was spread evenly on a mixture of lactose, sucrose and potato starch which were previously blended together. The chloroform solution was intimately mixed with the blend of three dry powders. The solvent-wet powder blend was allowed to air dry for one-half hour; was passed through a No. 11 sieve and the granules thus formed were allowed to dry until the solvent odor was imperceptible. In the meantime a blend of sodium lauryl sulfate and magnesium stearate was prepared and blended with the dried granules. The blended mix was tableted to provide a 350 mg. tablet.

The composition of each tablet was as follows:

| | Mg. |
|---|---|
| (1) Progesterone-cholesterol acetate eutectic mixture | 150 |
| (2) Polyvinylpyrrolidone (tablet grade) | 7.0 |
| (3) Lactose (U.S.P.—less than 100 microns particle size) | 200 |
| (4) Sucrose (U.S.P.—less than 100 microns) | 150 |
| (5) Sodium lauryl sulfate | 0.8 |
| (6) Magnesium stearate | 6.8 |
| (7) Potato starch (dried to less than 1% water) up to 700 mg. | 13.9 |

What is claimed is:

1. A pharmaceutical preparation adapted for hormone therapy by oral administration consisting essentially of a lipophilic solid solution of a therapeutically active steroid hormone in a sterol or sterol ester steroidal lipid vehicle melted in a melting region of stable equilibrium at a melting temperature range below that of the individual components, and solidified together, as an isomorphous substance in binary, ternary, or other multiphase mixture of two or more steroids and steroidal lipids, in dosage unit form, comprising, per dosage unit, an effective amount of steroid hormone within the range from about 50 to about 100 milligrams, the proportions of said steroid hormone and said steroidal lipid vehicle being effective to impart to said solid solution a lower melting temperature than that of the individual steroidal components and to increase the therapeutic activity of the steroid hormone by an amount substantially greater than that of the steroid hormone not in solid solution in said vehicle.

2. The preparation of Claim 1 in which the sterol is cholesterol.

3. The preparation of Claim 1 in which the sterol ester is cholesterol acetate.

4. The preparation of Claim 1 in which the sterol is β-sitosterol.

5. The preparation of Claim 1 in which the therapeutic active ingredient is a progestational steroid.

6. The preparation of Claim 5 in which the steroid is progesterone.

7. The preparation of Claim 5 in which the steroid is testosterone.

8. The preparation of Claim 1 in the form of a tablet.

9. The preparation of Claim 1 in the form of a capsule.

10. The preparation of Claim 1 in which the steroid hormone is progesterone and the steroidal lipid is cholesterol acetate.

11. Method for the administration of hormone therapy to a person requiring such therapy comprising orally administering to said person a pharmaceutical preparation consisting essentially of a lipophilic solid solution of a therapeutically active steroid hormone in a sterol or sterol ester steroidal lip vehicle melted in a melting region of stable equilibrium at a melting temperature range below that of the individual components, and solidified together, as an isomorphous substance in binary, ternary, or other multiphase mixture of two or more steroids and steroidal lipids, in dosage unit form, comprising, per dosage unit, an effective amount of steroid hormone within the range from about 50 to about 100 milligrams, the proportions of said steroid hormone and said steroidal lip vehicle being effective to impart to said solid solution a lower melting temperature than that of the individual steroidal component.

12. The method of Claim 11 in which said pharmaceutical preparation is a capsule, a table, or a lozenge.

References Cited
UNITED STATES PATENTS

| | | | |
|---|---|---|---|
| 2,195,595 | 4/1940 | Nitardy | 424—236 |
| 2,195,596 | 4/1940 | Nitardy | 424—236 X |
| 2,206,113 | 7/1940 | Nitardy | 424—236 |
| 2,413,419 | 12/1946 | Saunders et al. | 424—22 |
| 2,758,923 | 8/1956 | Wakely | 424—236 |
| 2,758,924 | 8/1956 | Wakely | 424—236 |
| 2,967,801 | 1/1961 | Clark | 424—236 |
| 3,481,955 | 12/1969 | Goldman | 424—240 X |

OTHER REFERENCES

Snart: Nature, 215 (5104):957–958, Aug. 26, 1967, "Liquid Crystalline Behaviour In Mixtures of Cholesterol With Steroid Hormones."

Kincl et al.: Acta Endocrinologica, 64:253–264, June 1970, "Sustained Release Hormonal Preparations 8. Diffusion of Various Steroids From Cholesterol Pellets."

Shimkin et al.: Endocrinology, 29:1020–1025 (1941), "Absorption Rate of Hormone-Cholesterol Pellets."

Segaloff: Endocrinology, 47:320–5 (1950), "The Gradation of Effectiveness and Absorption of Desoxycorticosterone Acetate Pellets by Dilution With Cholesterol."

SHEP K. ROSE, Primary Examiner

U.S. Cl. X.R.

424—236, 238, 240, 241, 242, 243